(12) United States Patent
Cote (10) Patent No.: US 10,422,470 B2
(45) Date of Patent: Sep. 24, 2019

(54) HUB MEMBER AND SUPPORTING ARMS FOR A POLE MOUNTED ASSEMBLY

(71) Applicant: Paul L. Cote, Lac Brome (CA)

(72) Inventor: Paul L. Cote, Lac Brome (CA)

(*) Notice: Subject to any disclaimer, the term of this patent is extended or adjusted under 35 U.S.C. 154(b) by 0 days.

(21) Appl. No.: 15/330,903

(22) Filed: Nov. 14, 2016

(65) Prior Publication Data

US 2017/0191606 A1 Jul. 6, 2017

(30) Foreign Application Priority Data

Nov. 13, 2015 (CA) .................................. 2911981

(51) Int. Cl.
| | | |
|---|---|---|
| *F16M 11/04* | (2006.01) | |
| *F16M 11/16* | (2006.01) | |
| *A45F 3/44* | (2006.01) | |
| *E04H 12/08* | (2006.01) | |
| *E04H 12/22* | (2006.01) | |
| *A01G 9/12* | (2006.01) | |
| *A01K 39/012* | (2006.01) | |
| *A01K 39/014* | (2006.01) | |
| *F16M 11/24* | (2006.01) | |
| *E04H 12/24* | (2006.01) | |
| *E04H 12/34* | (2006.01) | |
| *A01K 39/01* | (2006.01) | |
| *A47G 7/04* | (2006.01) | |
| *F16M 11/22* | (2006.01) | |

(Continued)

(52) U.S. Cl.
CPC .............. *F16M 11/16* (2013.01); *A01G 9/12* (2013.01); *A01K 39/01* (2013.01); *A01K 39/012* (2013.01); *A01K 39/014* (2013.01); *A45F 3/44* (2013.01); *A47G 7/041* (2013.01); *E02D 5/801* (2013.01); *E04H 12/08* (2013.01); *E04H 12/2223* (2013.01); *E04H 12/2238* (2013.01); *E04H 12/24* (2013.01); *E04H 12/347* (2013.01); *F16M 11/041* (2013.01); *F16M 11/046* (2013.01); *F16M 11/22* (2013.01); *F16M 11/24* (2013.01); *A45B 2023/0012* (2013.01); *F16M 11/04* (2013.01); *F16M 11/08* (2013.01); *F16M 2200/028* (2013.01); *F16M 2200/066* (2013.01); *F16M 2200/08* (2013.01)

(58) Field of Classification Search
USPC ........ 248/156, 158, 522, 530; 211/197, 196, 211/205
See application file for complete search history.

(56) References Cited

U.S. PATENT DOCUMENTS

| 342,476 | A | * | 5/1886 | Swartwout | .............. | A47F 7/283 |
|---|---|---|---|---|---|---|
| | | | | | | 211/103 |
| 1,697,866 | A | * | 1/1929 | Hansen | .................... | A47F 5/04 |
| | | | | | | 211/163 |

(Continued)

*Primary Examiner* — Alfred J Wujciak
(74) *Attorney, Agent, or Firm* — Eric Fincham (57) ABSTRACT

A hub and arm assembly for mounting on a pole, the assembly including a hub having an inner wall and an outer wall with at least one reinforced area formed thereon, the inner wall having a bottom surface, a plurality of transversely extending walls extending between the outer wall and the inner wall with at least one channel being defined therebetween, a supporting member having a vertical segment sized to fit within the channel, and a support arm extending outwardly from the vertical segment, the support arm having a downwardly extending segment designed to abut the reinforced portion of the outer wall.

10 Claims, 11 Drawing Sheets

(51) Int. Cl.
    *E02D 5/80*       (2006.01)
    *F16M 11/08*    (2006.01)
    *A45B 23/00*    (2006.01)

(56) References Cited

U.S. PATENT DOCUMENTS

| | | | | |
|---|---|---|---|---|
| 2,597,157 | A * | 5/1952 | Martino | A47G 25/08 |
| | | | | 126/30 |
| 3,788,489 | A * | 1/1974 | Levinthal | A47F 5/04 |
| | | | | 211/163 |
| 4,117,629 | A * | 10/1978 | Ekdahl | A01G 9/02 |
| | | | | 211/107 |
| 4,865,283 | A * | 9/1989 | Parker | A47F 5/04 |
| | | | | 108/191 |
| 5,037,049 | A * | 8/1991 | Funk | A47F 5/01 |
| | | | | 248/165 |
| 5,487,476 | A * | 1/1996 | Barfield | A47G 7/042 |
| | | | | 211/205 |
| 6,568,546 | B1 * | 5/2003 | Huang | A47B 49/00 |
| | | | | 211/205 |
| 2003/0173474 | A1 * | 9/2003 | Taylor | A45F 3/44 |
| | | | | 248/156 |
| 2005/0236532 | A1 * | 10/2005 | Bain | A47G 25/0664 |
| | | | | 248/158 |
| 2006/0272687 | A1 * | 12/2006 | Tanner | E04H 12/2223 |
| | | | | 135/16 |
| 2011/0073553 | A1 * | 3/2011 | Buege | A47F 5/04 |
| | | | | 211/59.4 |

* cited by examiner

HUB MEMBER AND SUPPORTING ARMS FOR A POLE MOUNTED ASSEMBLY

FIELD OF THE INVENTION

The present invention relates to a hub and arm assembly for mounting on a pole.

BACKGROUND OF THE INVENTION

The use of poles for mounting other objects thereon is well established in the prior art. The poles can either be mounted on a stand or alternatively, may be inserted into the soil by applying a rotational force thereto. Typically, the pole will have a screwthread configuration on the bottom portion thereof and the means for applying a rotational force conventionally comprises a transverse bar through which a rotational force may be applied.

Such pole systems suffer from a lack of stability when a transverse force is applied thereto. Typically, such systems will employ a hub or like member to which arms may be attached. The arms in turn are utilized for supporting other objects such as bird feeders, containers, and the like. The use of such systems is limited as they cannot support a substantial weight.

SUMMARY OF THE INVENTION

It is an object of the present invention to provide a hub and arm assembly for mounting on a pole wherein both the hub and the arms are capable of supporting a substantial weight.

According to one aspect of the present invention, there is provided a hub and arm assembly for mounting on a pole comprising a hub having an inner wall and an outer wall, the outer wall having at least one reinforced area formed thereon, the inner wall having a bottom surface, a plurality of transversely extending walls extending between the outer wall and the inner wall, at least one channel being defined by the inner wall, the outer wall and the transverse walls, a supporting member having a vertical segment, the vertical segment being sized to fit within the channel, a support arm extending outwardly from the vertical segment, the support arm having a downwardly extending segment designed to abut the reinforced portion of the outer wall.

The pole used in the embodiments of the present invention may vary. Thus, the pole may be inserted into the soil, usually by means of a screwthreaded lower portion, or alternatively, may utilize a stand or the like.

The hub utilized in the present invention, and as stated above, generally has an inner wall and an outer wall with a plurality of transversely extending walls extending between the outer wall and the inner wall to thereby define one or more channels between the inner wall, outer wall and transverse walls. The channels can be of varying sizes and the use of projections formed on the transversely extending walls may further reduce the size of the channel if so desired.

Adjacent the channel designed to receive the supporting member is a reinforced area. The reinforced area is formed on the outer wall and is designed to abut the supporting member to provide support therefore.

Generally, the reinforced area will comprise a projection formed on the outer wall to substantially increase the thickness thereof at the point where the supporting member abuts the outer wall. This arrangement permits the formation of a hub which can be aesthetically pleasing and does not require the use of vast amounts of material.

The supporting member, as above mentioned, has a vertical segment which is designed to fit within the channel. A support arm extends outwardly from the vertical segment and has a downwardly extending segment designed to abut the reinforced areas of the outer wall. The supporting member may be formed of any suitable material, but preferably is formed of a metallic or plastic material.

Preferably, the outer wall has a slot formed therein adjacent where the channels are located in order to receive the support arm.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
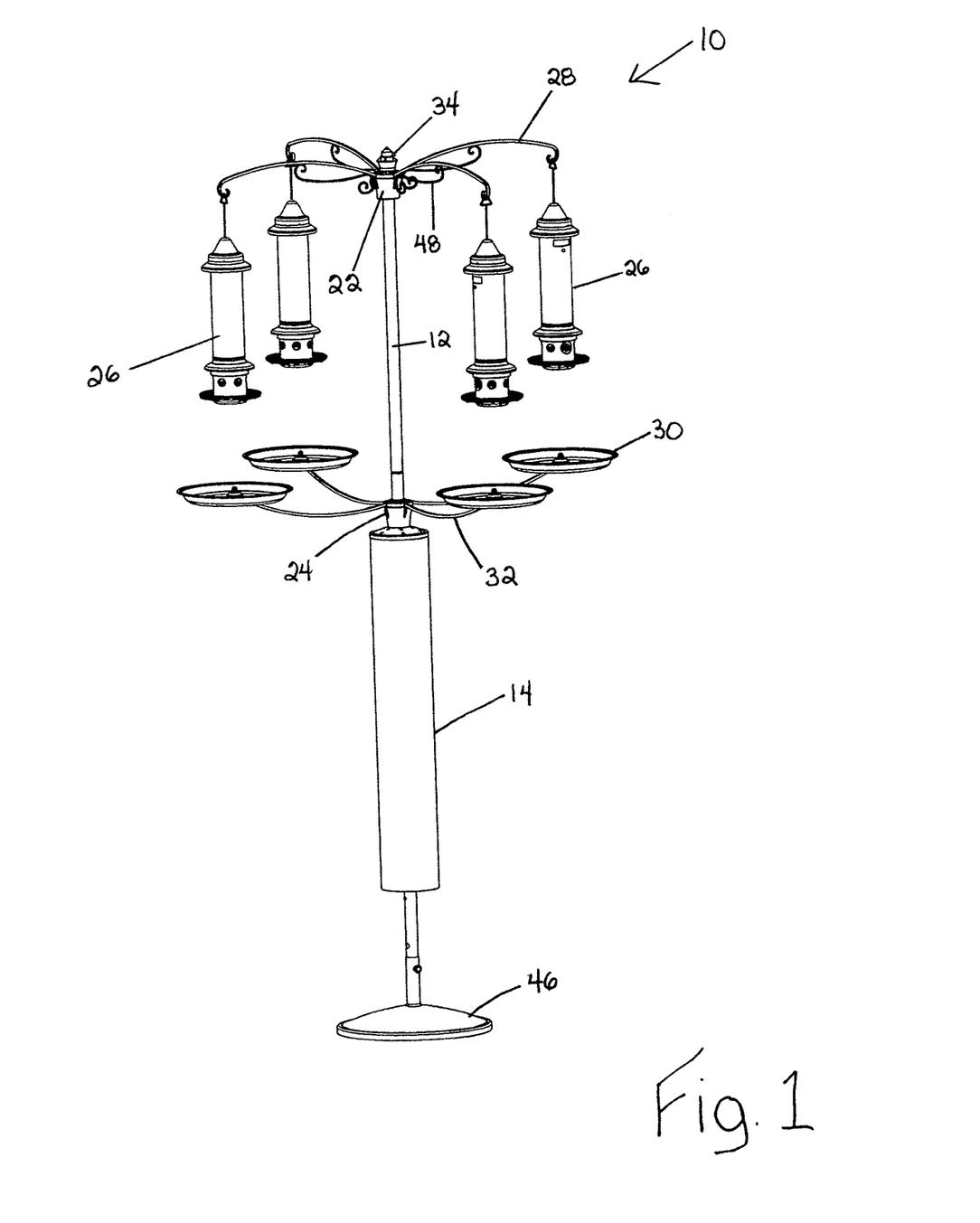
FIG. 1 is a perspective view of a pole mounted hub member with supporting arms.

Referring to the drawings in greater detail and by reference characters thereto, there is illustrated in FIG. 1 one embodiment of a pole mounted bird feeding system. This system is generally designated by reference numeral 10.

System 10 includes a central pole 12. Pole 12 may be formed of several sections suitably secured together as may be seen in FIGS. 2 and 3. Surrounding a lower part of pole 12 is a baffle 14 to prevent access to the pole by marauders such as squirrels and raccoons. Pole 12 is also provided with a series of apertures 16 for reasons which will become apparent hereinbelow.

Figure 2:
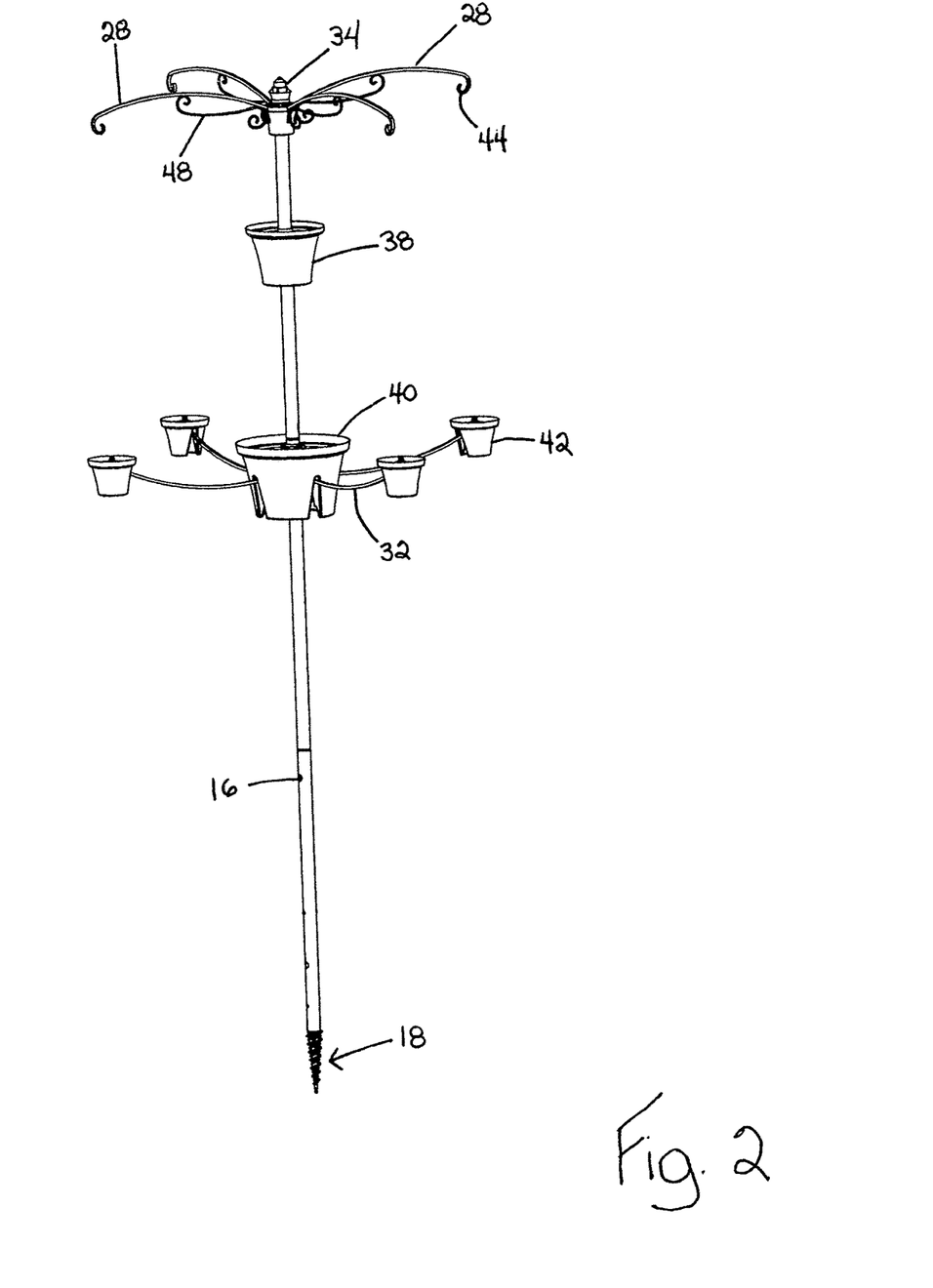
FIG. 2 is a perspective view of a further embodiment thereof.

In the embodiment of FIG. 2, pole 12 is provided with a screwthreaded end generally designated by reference numeral 18. Screwthreaded end 18 is conveniently of the type shown in co-pending application Ser. No. 15/330,615 entitled Screwthreaded Pole filed Oct. 19, 2016 in the name of Inventor Paul L. Cote, the teachings thereof are hereby incorporated by reference.

Mounted on pole 12 is an upper hub 22 and a lower hub 24. A plurality of arms 28 extend outwardly from upper hub 22 and each arm carries a bird feeder generally designated by reference numeral 26. Bird feeders 26 may be any suitable; a preferred type of bird feeder is that shown in U.S. Pat. No. 7,191,731 having common inventorship with instant application.

Extending outwardly from lower hub 24 are a plurality of arms 32 each of which support a tray 30. The arrangement is such that there is provided a tray 30 for each bird feeder 26 with the respective tray being located below the bird feeder. This arrangement is advantageous in that many birds when feeding at bird feeder 26 will pick and discard many seeds before they elect to eat one. These discarded seeds would normally be a nuisance as they must be picked up. The discarded seeds also tend to kill vegetation around the bird feeder.

At the top of pole 12 there is provided a finial 34. As shown in the embodiment of FIG. 2, the system may also include containers for plants or the like. In the arrangement shown in FIG. 2, there is provided a central container 38 which is mounted on pole 12. A further container 40 is located therebelow while the arrangement is such that arms 32 support a plurality of smaller containers 42. This provides the user with many options as to how the containers may be used such as utilizing plants which are known to be attractive to birds.

Arms 28, as may be seen in FIG. 2, have a hook 44 formed at the outer most end thereof for hanging bird feeders 26.

Figure 3:
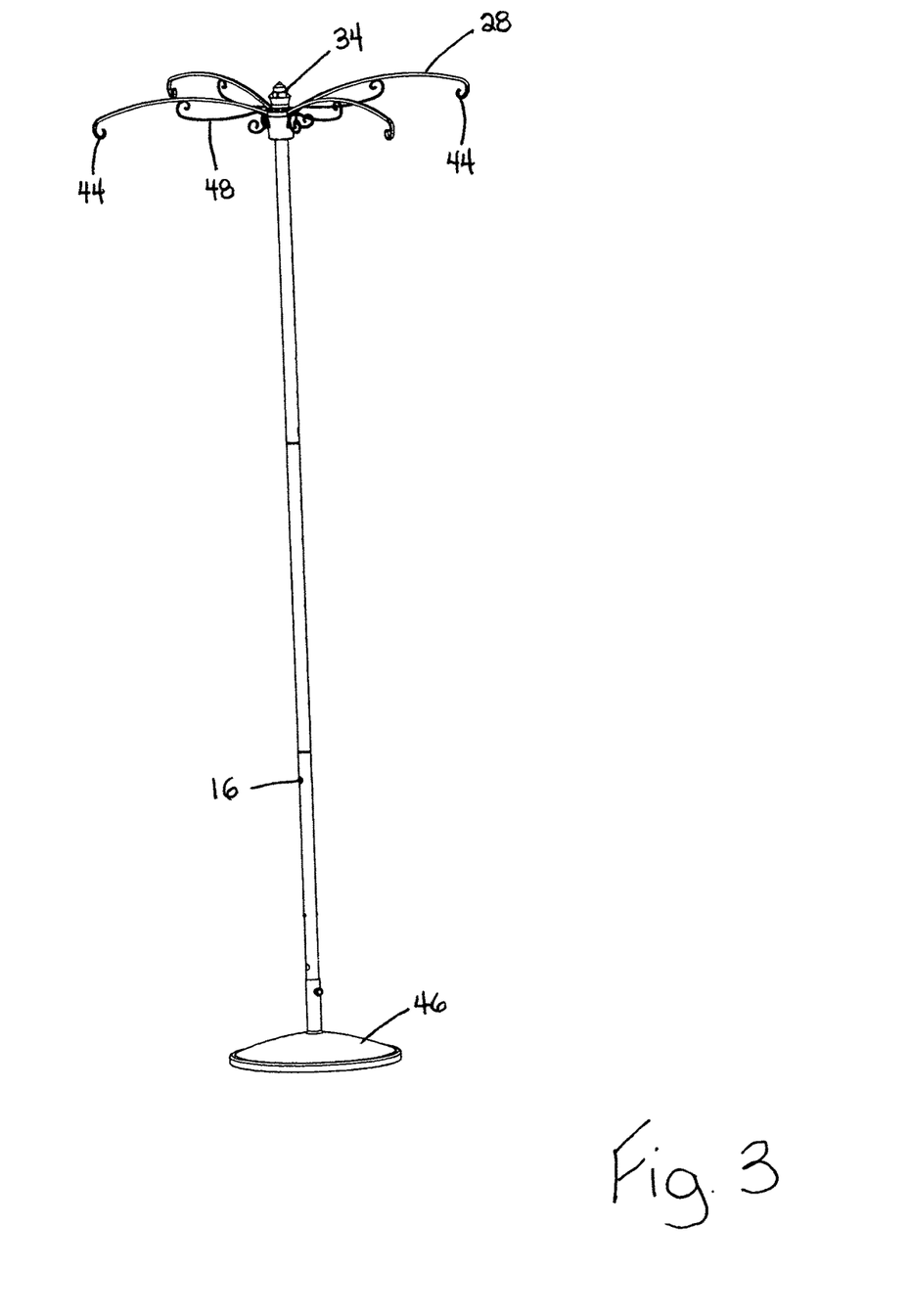
FIG. 3 is a perspective view of the pole and supporting arms.

As an alternative to the screwthreaded end, a base member 46 may be utilized as shown in FIGS. 1 and 3. Base member 46 will be of a suitable dimension to securely mount pole 12.

Each arm 28 has a downwardly extending segment 48 for reasons which will become apparent hereinbelow.

Figure 4:
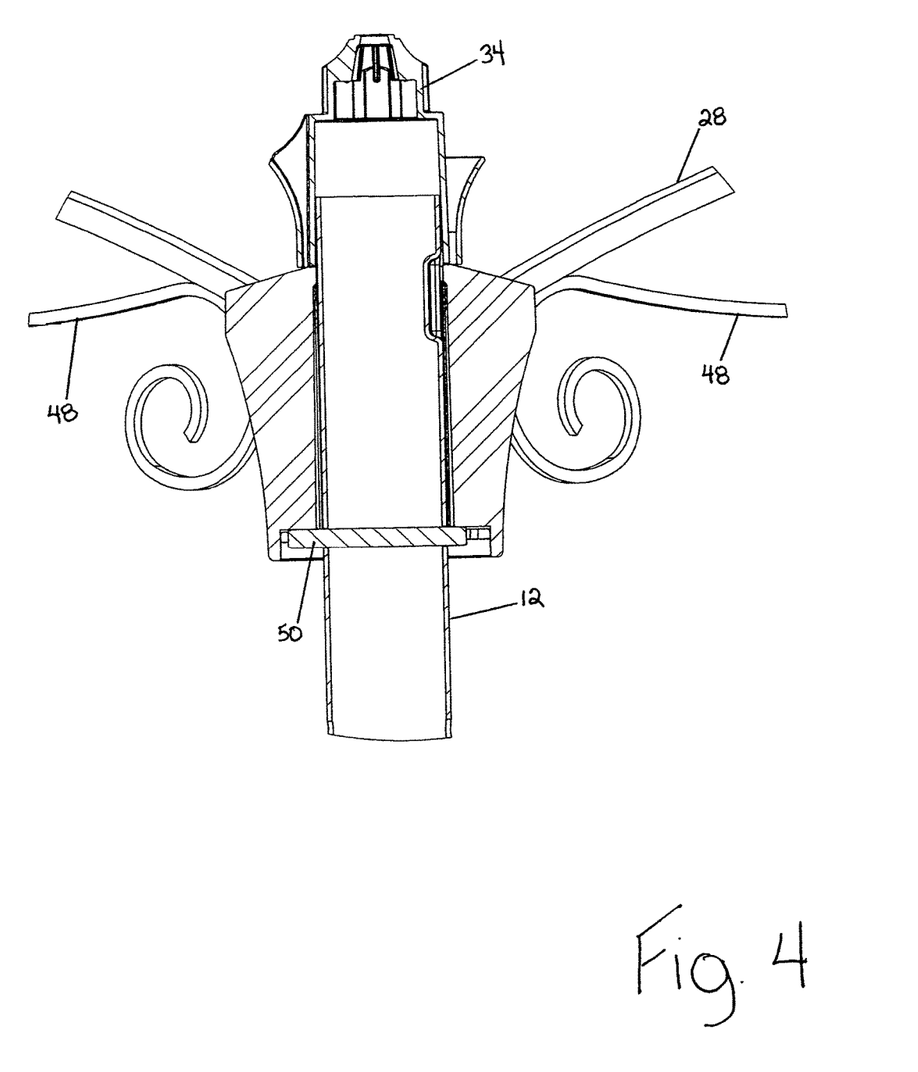
FIG. 4 is a cross-sectional view of the hub member and arms of FIG. 3.
Figure 5:
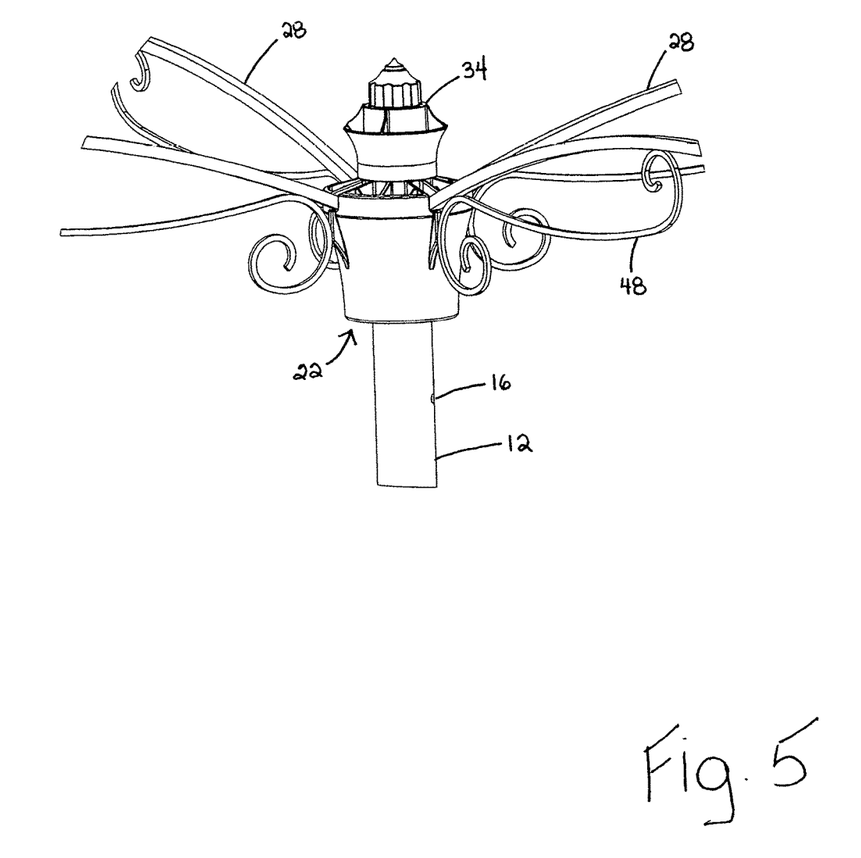
FIG. 5 is an enlarged perspective view of the upper end of the pole assembly.
Figure 6:
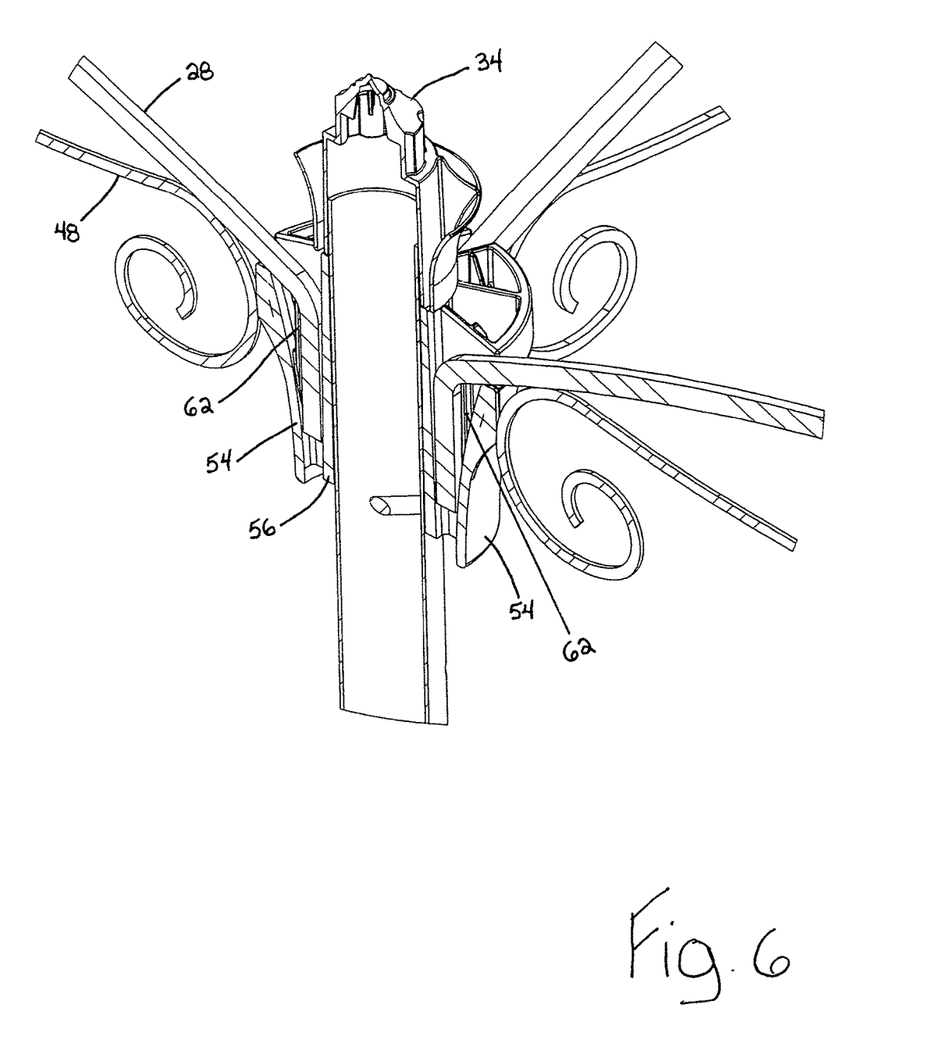
FIG. 6 is a cross-sectional view of the hub and arms of FIG. 5.
Figure 7:
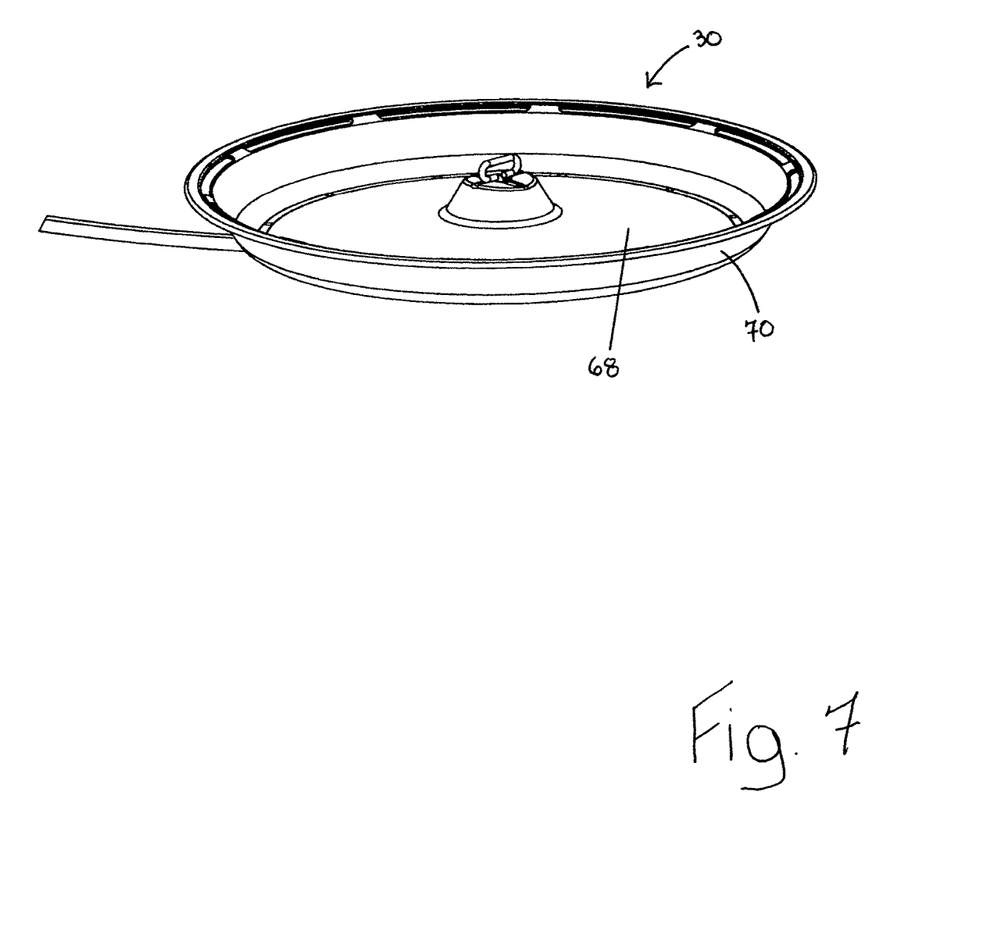
FIG. 7 is an enlarged perspective view of the trays of FIG. 1.
Figure 8:
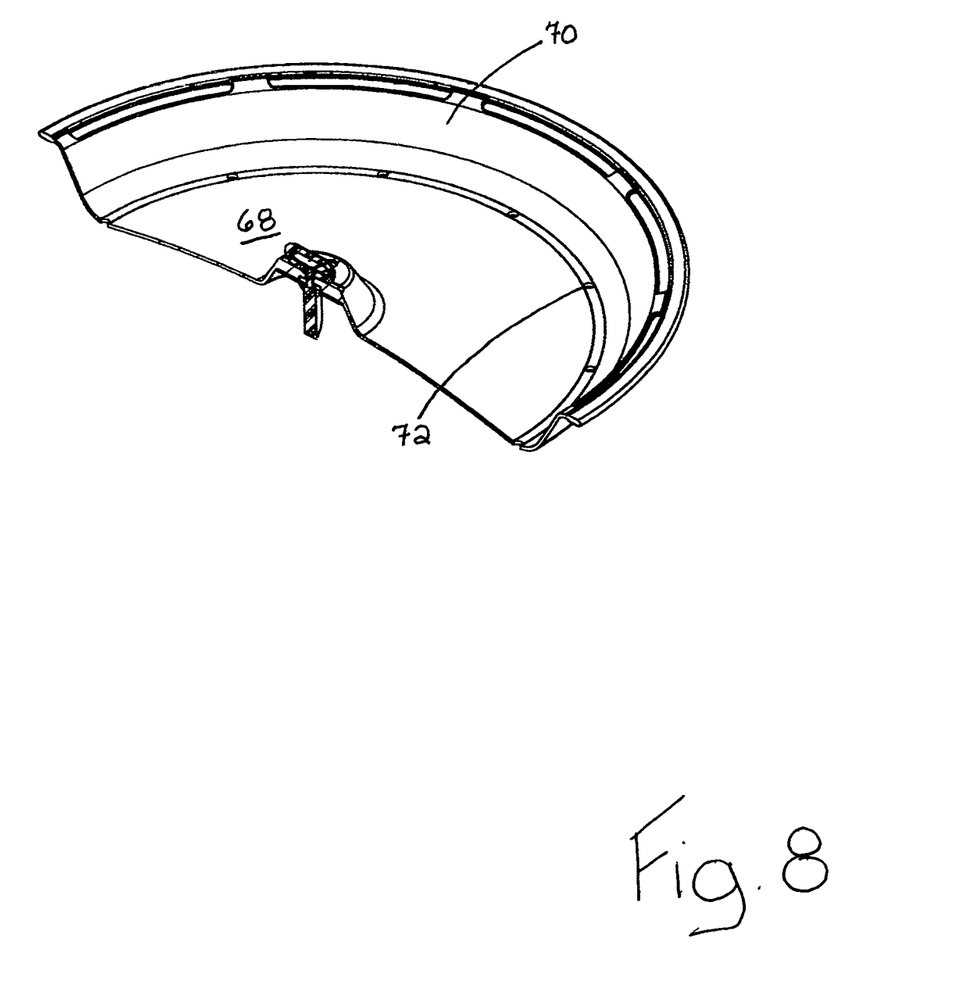
FIG. 8 is cross-sectional view of the tray of FIG. 7.
Figure 9:
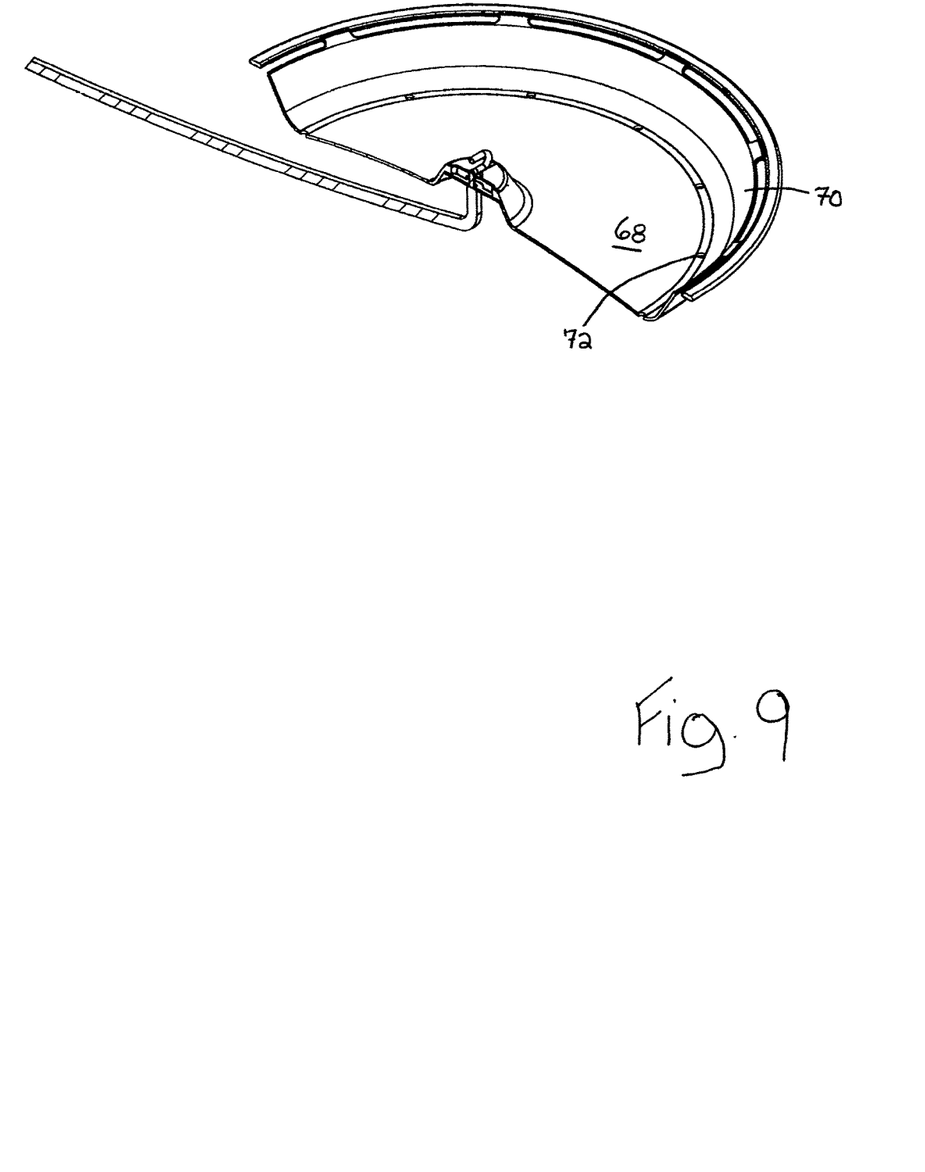
FIG. 9 is a further cross-sectional view thereof.
Figure 10:
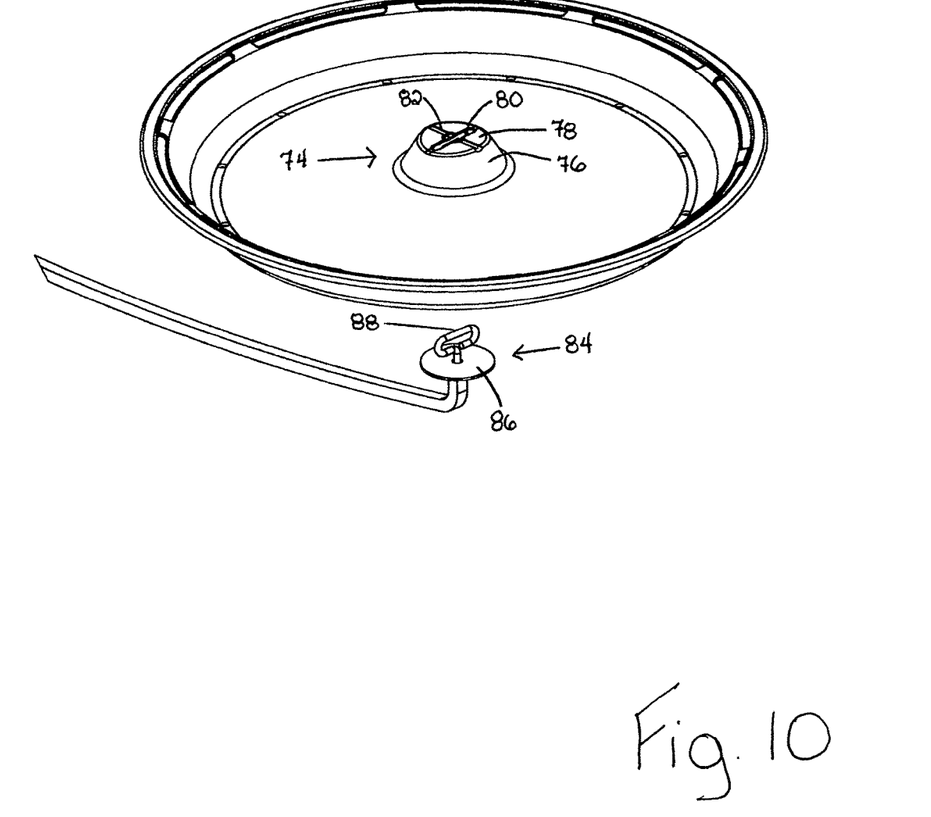
FIG. 10 is an exploded view thereof.

As may be most clearly seen in FIG. 4, upper hub 22 is maintained in position on pole 12 by means of a pin 50 which extends to one of the apertures 16. Pin 50 is utilized to support upper hub 22 and is preferably provided with a structure as shown in co-pending application entitled Pole and Hub filed Nov. 11, 2016 in the name of Inventor Paul L. Cote, the teachings of which are hereby incorporated by reference.

Hub 22 includes an outer wall 54 and an inner wall 56. A plurality of transversely extending walls 58 extend between inner wall 56 and outer wall 54. The outer wall 54, inner wall 56 and transversely extending walls 58 define channels 60. If desired, a pair of projections 62 extending inwardly from transversely extending walls 58 may be used to define channels 60.

Formed on outer wall 54 adjacent channels 60 are reinforced areas 64. Reinforced areas 64 comprise a thickened area which is provided such that downwardly extending segment 48 may abut thereagainst to thereby support arm 28.

Trays 30, as may be seen in FIGS. 7 to 11, are formed with a central bottom wall 68 with a side wall 70 extending upwardly therefrom. Proximate the point of juncture of bottom wall 68 and side wall 70 are drainage apertures 72 to prevent water to drain therefrom.

Each tray 30 further includes a center structure generally designated by reference numeral 74 and which includes a side wall 76 and a top wall 78. A pair of crisscrossing 80, 82 are formed in top wall 78.

Figure 11:
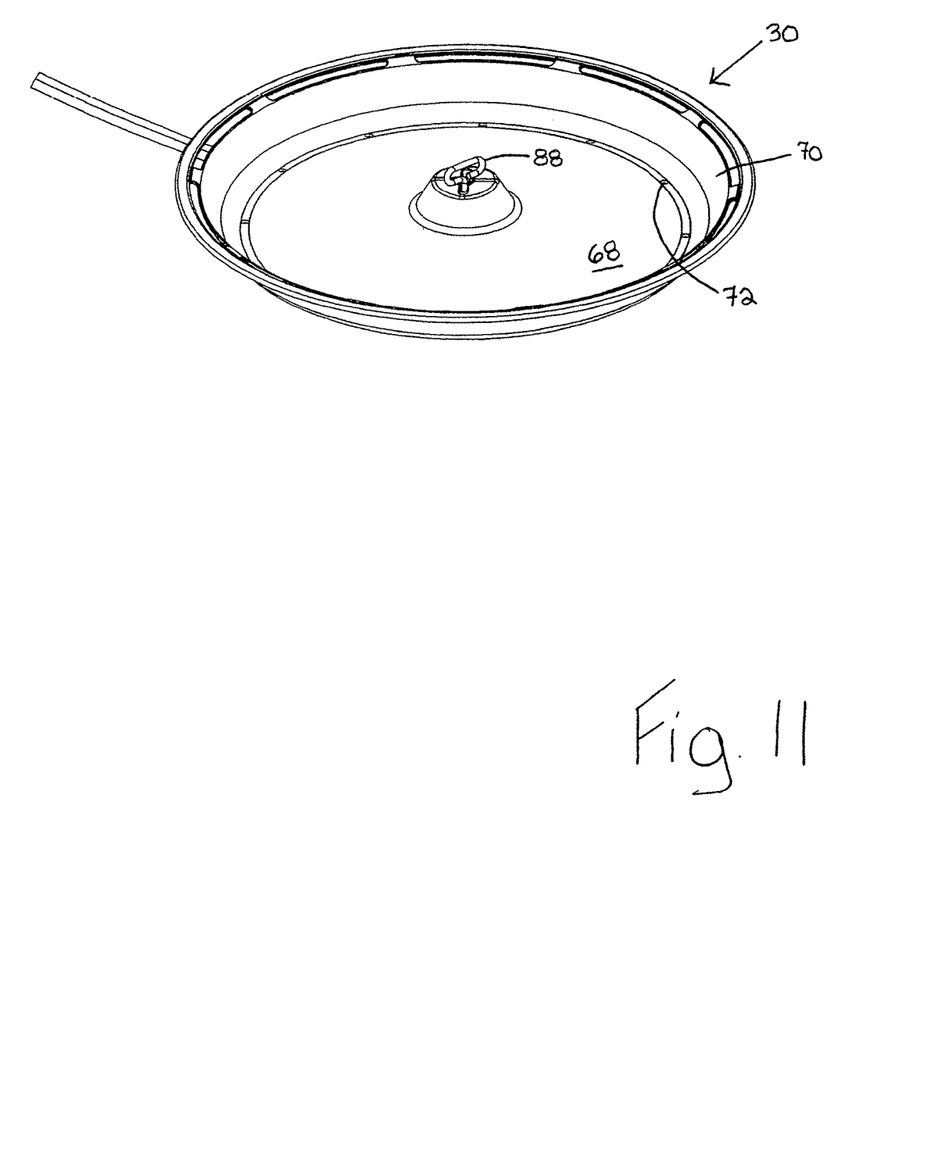
FIG. 11 is a perspective view of the tray in a locked position.

The arrangement is such that a locking structure 84 is provided at the end of each arm 32. Locking structure 84 includes a base 86 and an elongated locking element 88 which is designed to fit within one of slots 80, 82 and the tray is then rotated to lock tray 30 in position as shown in FIG. 11.

I claim:

1. A hub and arm assembly for mounting on a pole comprising:
   a hub having an inner wall and an outer wall, said inner wall and said outer wall being spaced from each other, said outer wall having at least one reinforced area formed thereon, said reinforced area being surrounded by adjacent outer wall portions, said reinforced area having a greater thickness compared to said adjacent outer wall portions, said inner wall having a bottom surface, a plurality of transversely extending walls extending between said outer wall and said inner wall, at least one channel being defined by said inner wall, said outer wall and said transversely extending walls;
   a supporting member having a vertical segment, said vertical segment being sized to fit within said channel, a support arm extending outwardly from said vertical segment, said support arm having a downwardly extending segment designed to abut said reinforced portion of said outer wall.

2. The hub and arm assembly of claim 1 wherein said reinforced area formed on said outer wall is located adjacent said at least one channel.

3. The hub and arm assembly of claim 1 wherein said at least one channel is defined by said outer wall, a pair of said transversely extending walls, and first and second projections extending outwardly from said pair of transversely extending walls.

4. The hub and arm assembly of claim 1 wherein said outer wall tapers inwardly from top to bottom.

5. The hub and arm assembly of claim 1 wherein said support arm has a hook shape formed at a free end thereof.

6. The hub and arm assembly of claim 1 wherein said pole has a screwthreaded end for insertion into soil.

7. The hub and arm assembly of claim 1 wherein said pole is mounted on a base stand.

8. The hub and arm assembly of claim 1 wherein said hub is formed of a plastic material.

9. The hub and arm assembly of claim 1 wherein said reinforced area comprises a projection formed on said outer wall.

10. The hub and arm assembly of claim 1 comprising a plurality of supporting members, said hub having a plurality of slots formed therein.

* * * * *